(12) United States Patent
Egami

(10) Patent No.: US 6,384,559 B2
(45) Date of Patent: May 7, 2002

(54) ELECTRIC POWER EQUIPMENT FOR ELECTRIC VEHICLE

(75) Inventor: Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/777,699

(22) Filed: Feb. 7, 2001

(30) Foreign Application Priority Data

Feb. 10, 2000 (JP) ........................................ 2000-032885

(51) Int. Cl.$^7$ ................................................ B60L 11/00
(52) U.S. Cl. ........................................ 318/500; 318/139
(58) Field of Search ............................... 318/139, 140, 318/145, 148, 368, 459, 500, 722, 798, 799, 800, 801; 388/928.1; 180/65.1, 65.3, 65.4, 65.8

(56) References Cited

U.S. PATENT DOCUMENTS

| | | | |
|---|---|---|---|
| 5,434,477 A | | 7/1995 | Crouse et al. |
| 5,495,908 A | * | 3/1996 | Obara et al. ................ 180/65.8 |
| 5,583,751 A | * | 12/1996 | Nakazawa et al. ............ 363/20 |
| 5,998,884 A | * | 12/1999 | Kitamine et al. .......... 307/10.1 |
| 6,208,540 B1 | * | 3/2001 | O'Meara et al. ............... 363/98 |
| 6,262,896 B1 | * | 7/2001 | Stancu et al. .................. 363/17 |
| 6,313,546 B1 | * | 11/2001 | Nishimura et al. .......... 307/9.1 |

\* cited by examiner

*Primary Examiner*—Bentsu Ro
(74) *Attorney, Agent, or Firm*—Oliff & Berridge, PLC

(57) ABSTRACT

An electric power equipment for a hybrid electric vehicle includes a main battery, an auxiliary battery, an inverter for supplying a prescribed lower-frequency AC power from the main battery to a motor-generator and DC power to the main battery from the rotary electric machine and an auxiliary battery charging circuit. The auxiliary battery charging circuit includes a frequency filter for passing only AC power of a prescribed higher frequency that is too high for the motor-generator to be operated, a rectifier and a controller for controlling the inverter.

6 Claims, 3 Drawing Sheets

ELECTRIC POWER EQUIPMENT FOR ELECTRIC VEHICLE

CROSS REFERENCE TO RELATED APPLICATION

The present application is based on and claims priority from Japanese patent application 2000-32885 filed Feb. 10, 2000, the contents of which are incorporated herein by reference.

BACKGROUND OF THE INVENTION

1. Field of the Invention

The present invention relates to an electric power equipment and, particularly, a dual voltage system for an electric vehicle that has a high voltage main DC power source and a low voltage auxiliary DC power source.

2. Description of the Related Art

A dual voltage system of a vehicle that includes a main DC power source and an auxiliary power source is already known. The main power source, such as Ni-MH battery, fuel cell or a lead acid battery is used for driving a hybrid electric vehicle, an electric vehicle or the like. In order to reduce transmission loss of the electric power, the voltage of the main DC power source is generally set as high as possible. On the other hand, the auxiliary power source is necessary to supply low voltage power to various vehicle loads.

A hybrid electric vehicle is equipped with a DC-DC converter that supplies electric power from the main power source to the auxiliary power source, which has much smaller capacity than the main power source, regularly or temporarily in an emergency. However, such a DC-DC converter complicates a control system of the dual voltage system.

SUMMARY OF THE INVENTION

Therefore, a main object of the invention is to provide an improved and inexpensive dual voltage system that has no DC-DC converter.

According to a feature of the invention, an electric power equipment includes an inverter for supplying a rotary electric machine a prescribed lower-frequency AC power from a main battery and for charging the main battery by the rotary electric machine and a main-to-auxiliary battery-power supply circuit for supplying electric power to an auxiliary battery when the terminal voltage of the auxiliary battery is lower than a reference voltage. The main-to-auxiliary power supply circuit includes a frequency filter for passing only AC power of a prescribed higher frequency that is too high for the rotary electric machine to be operated and a rectifier for converting the AC power to DC power to be charged to the auxiliary battery.

Therefore, a DC-DC converter is not necessary for charging the auxiliary battery.

Preferably, a controller for the inverter provides both the lower frequency AC power and higher frequency AC power when the terminal voltage of the auxiliary battery is lower than a reference voltage. The frequency filter preferably includes a series circuit of a coil and a capacitor having a resonance frequency. The main-to auxiliary battery power supply circuit may further include a voltage transformer having a primary coil connected to the rotary electric machine and a secondary coil connected to the rectifier.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
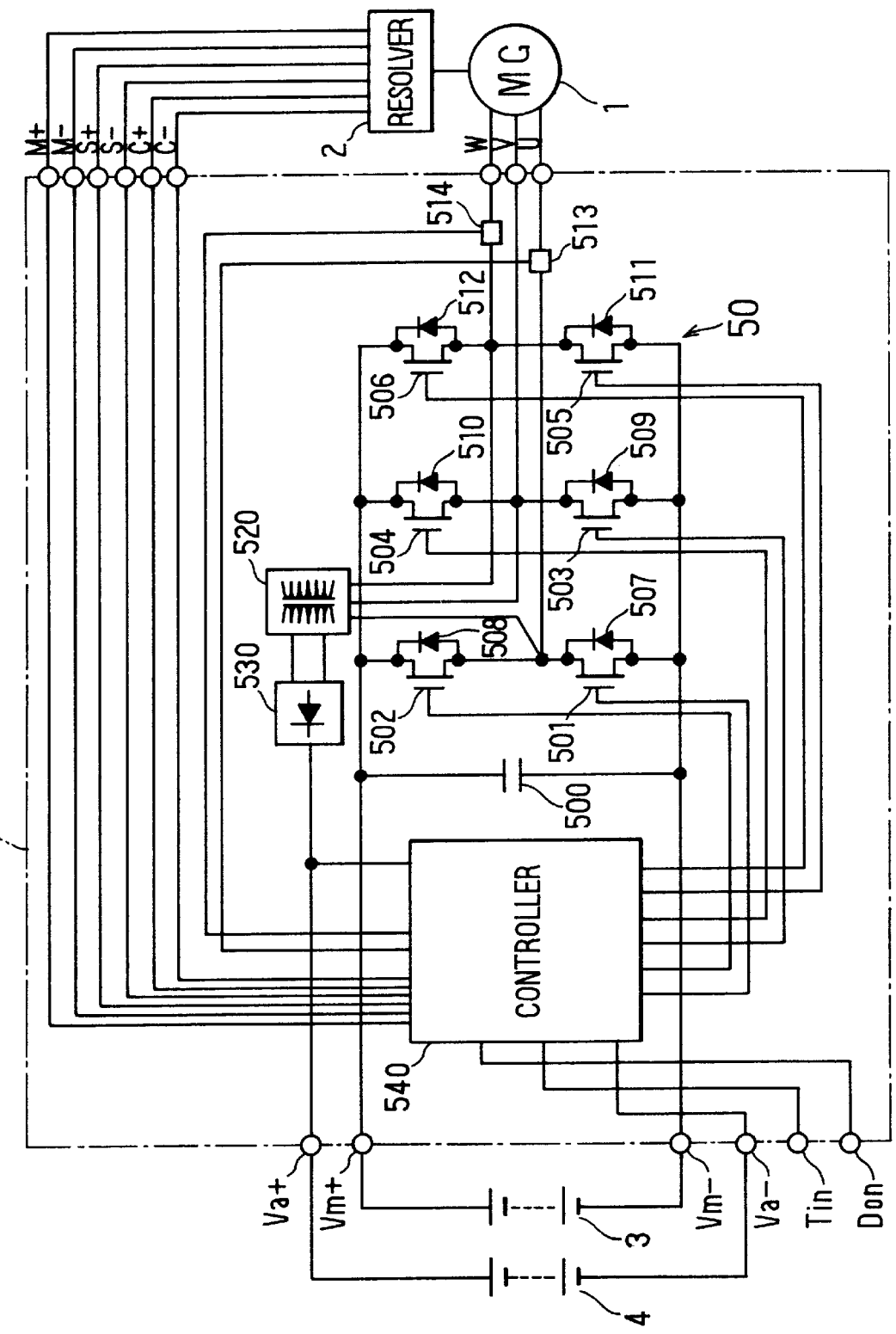
FIG. 1 is a circuit diagram of an electric power equipment according to a first embodiment of the invention.

An electric power equipment according to a first embodiment of the invention is described with reference to FIGS. 1, 2 and 5.

The electric power equipment includes a three-phase motor-generator 1, a resolver 2, a high voltage main battery 3, an auxiliary battery 4 and a control circuit unit 5.

The motor generator 1 is a permanent magnet type synchronous rotary machine. The motor-generator 1 is linked to an engine directly or via transmission such as a belt or a gear unit to supplement engine output torque and to generate AC power. The resolver detects rotor position of the motor-generator 1. The terminal voltage of the main battery 3 is 36 V, and the terminal voltage of the auxiliary battery is 12 V.

The circuit unit 5 includes AC output terminals U, V and W, resolver terminals M+, M−, S+, S−, C+ and C−, auxiliary battery terminals Va+ and Va−, main battery terminals Vm+ and Vm− and command input terminals Tin and Don. The terminal Tin receives a torque command signal ST that control the motor-generator 1 from the outside, and the terminal Don receives a battery-charge command signal SC from the outside to control charging of the auxiliary battery 4. When the command signal SC is in a high level H, the auxiliary battery is charged. On the other hand, when the command signal SC is in a low level L, the auxiliary battery is not charged. The circuit unit 5 includes a three-phase inverter 50, a smoothing capacitor 500, current sensors 513 and 514, a frequency-filter-and-voltage-transformer unit (hereinafter referred to as the FTU 520), a rectifier 530 and a controller 540.

The three-phase inverter 50 is a well-known circuit that converts high voltage DC power of the main battery 3 into AC power. The DC power is supplied respectively to a U-phase inverter, a V-phase inverter and W-phase inverter. The V-phase inverter V is comprised of series-connected low-side and high-side switching elements 501 and 502, the U-phase inverter is comprised of series-connected low-side and high-side switching elements 503 and 504, and the W-phase inverter is comprised of series-connected low-side and high-side switching elements 505 and 506. Each of the switching elements 501–506 has one of parallel diodes 507–512 that is connected so that the polarity thereof is opposite to the polarity of the switching element.

The smoothing capacitor 500 is connected in parallel to the main battery 3 to absorb high frequency noises caused by the three-phase inverter 50.

Figure 5:
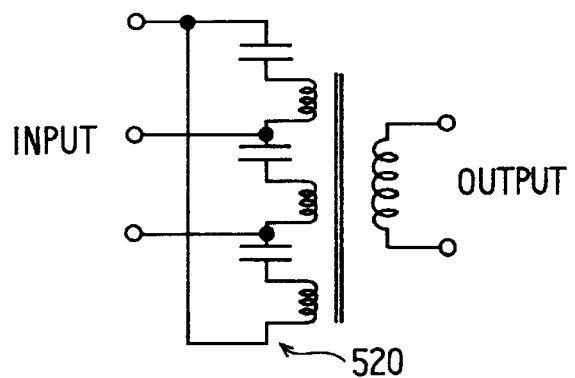
FIG. 5 is a circuit diagram of a filter-transformer unit of the electric power equipment shown in FIG. 1.

The FTU 520 is comprised of a delta circuit that is formed of three series circuits of a primary coil and a capacitor and a common secondary coil, as shown in FIG. 5. The ratio of transformation of the FTU 520 is set so that the terminal voltage of the secondary coil is suitable to charge the auxiliary battery 4. The FTU 520 insulates the main battery 3 and its circuit portions from the auxiliary battery 4 and its circuit portions and also conducts prescribed high frequency components of electric power. The resonance frequency fs of the input terminals of the FTU 520 is set a value, for example 50–500 kHz, that is the middle of the frequency band of the high frequency components to be conducted. This resonance frequency fs is much higher than the frequency, for example less than 10 kHz, of the three-phase voltage signals Vu, Vv and Vw.

The rectifier 530 is comprised of a single-phase full-wave bridge circuit, which rectifies the high frequency components of the electric power supplied from the output terminal of the FTU 520 and supplies the rectified power to the auxiliary battery 4. A smoothing capacitor (not shown) may be connected across the output terminals of the rectifier 530, if necessary.

The controller 540 forms, as motor-generator drive signals, three-phase PWM-voltage signals Vu', Vv' and Vw', through a well-known field oriented control, from the torque command signal ST, sine and cosine signals (rotation angle signals) supplied by the resolver 2 and current signals supplied from the current sensors 513 and 514. Each of the PWM-voltage signals Vu', Vv' and Vw' includes a signal of a low frequency less than 2 kHz that is pulse-width-modulated by a carrier wave of 10 kHz. If the charge command signal SC is in the H level, the controller 540 forms PWM charge signals Vcu', Vcv' and Vcw' from three-phase high frequency voltage signals Vcu, Vcv and Vcw whose frequency is the same as the resonance frequency fs, as long as the terminal voltage of the auxiliary battery 4 is lower than a reference voltage Vref. PWM charge signals Vcu', Vcv' and Vcw' includes a carrier wave of 100 kHz. The controller 540 also forms three-phase gate control PWM signals to be applied to the gates of the switching elements 501–506 from the motor-generator drive signals Vu', Vv' and Vw' and the charge signals Vcu', Vcv' and Vcw'.

Because the motor generator 1 has a large inductance, the operation thereof is not affected by such high frequency voltage signals Vcu, Vcv and Vcw or carrier waves.

The FTU 520 has a comparatively narrow band for conducting the signals of the frequencies near the resonance frequency. Therefore, only the high frequency components of the electric power that correspond to the charge PMW signals Vcu', Vcv' and Vcw' can be supplied from the FTU 520 so that the auxiliary battery 4 can be charged only when the terminal voltage of the auxiliary battery 4 is lower than the reference voltage.

Figure 2:
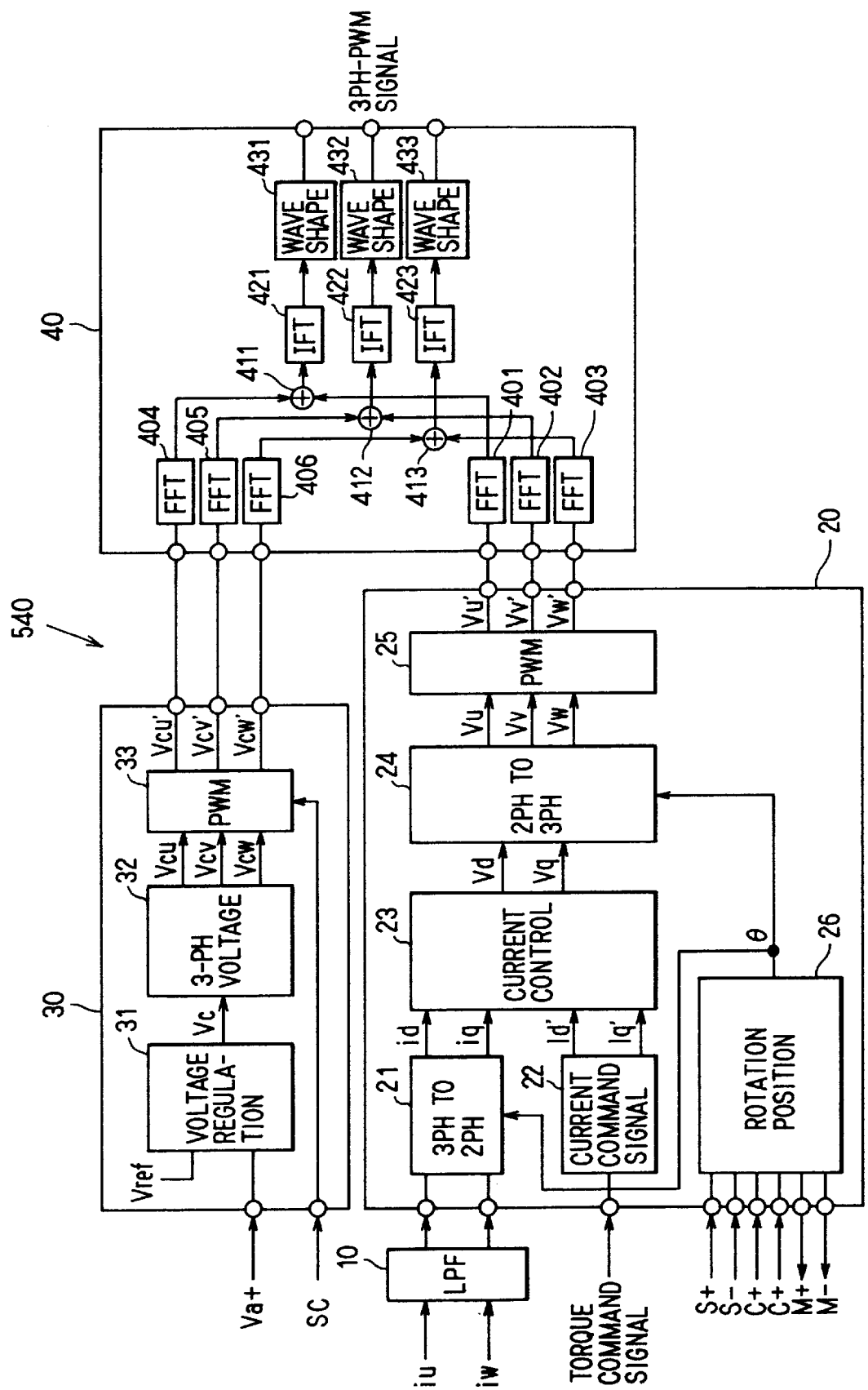
FIG. 2 is a block diagram of a controller of the electric power equipment shown in FIG. 1.

As shown in FIG. 2, the controller 540 includes a front low-pass filter 10, a drive-voltage operation unit 20, a charge-signal operation unit 30 and signal-synthesizing unit 40. The drive-voltage operation unit 20 provides PWM-voltage signals Vu', Vv' and Vw' for controlling the motor-generator 1. The charge-signal operation unit 30 provides the charge signals Vcu', Vcv' and Vcw', and the signal-synthesizing unit 40 synthesizes voltage signals Vu', Vv' and Vw' and the charge signals Vcu', Vcv' and Vcw' to form gate control PMW signals to be applied to the respective gates of the switching elements 501–506 of the inverter 50.

The front low-pass filter 10 selects low-frequency components of the U-phase current Iu and V-phase current Iv, which are supplied to the low-pass filter 10 via the current sensors 513 and 514. The frequency band for passing the low-frequency components corresponds to the frequency band (less than 2 kHz) of the three-phase signal voltage Vu, Vv and Vw.

The drive-voltage operation unit 20 includes a three-phase-to-two-phase conversion unit 21, a current command signal unit 22, a current control unit 23, a two-phase-to-three-phase conversion unit 24, a PWM unit 25 and a rotation position detecting unit 26. The drive-voltage operation unit 20 is comprised of a well-known vector operation circuit that includes a digital signal processor or a microcomputer that has software for controlling the motor.

The three-to-two-phase reduction unit 21 converts the low-frequency components of U-phase current Iu and V-phase current Iv to current values Iy and Ix of the static orthogonal coordinates according to the rotation angle θ of the motor-generator 1 that is detected by the rotation position detecting unit 26. The phase reducton unit 21 further converts the current values Iy and Ix to current values Id and Iq of the rotational coordinates.

The current command signal unit 22 converts the torque command signal to current command values Id' and Iq' of the rotation coordinates. The current control unit 23 provides motor input voltages Vd and Vq of the rotational coordinates to be applied to the motor-generator 1 so that the current values Id and Iq can near the current command values Id' and Iq'.

The two-to-three-phase splitting unit 24 converts the voltage values Vd and Vq of the rotational coordinates to voltage values Vy and Vx of the static orthogonal coordinates according to the rotation angle θ detected by the rotation position detecting unit 26 and further converts the voltage values Vy and Vx to three-phase voltage command values Vu, Vv and Vw.

The PWM unit 25, which may be comprised of hardware or software, provides three-phase PWM voltage signals Vu', Vv' and Vw' having duty ratios that are proportional to the three-phase voltage command values Vu, Vv and Vw. The PWM voltage signals Vu', Vv' and Vw' can be formed by providing a saw-tooth wave that has the same frequency as the carrier wave, which is compared with the command values Vu, Vv and Vw.

The rotation position detecting unit 26 forms the rotation angle θ of the motor-generator 1 from the sine and cosine signals detected by the resolver 2.

Since the above described inverter that provides phase current Iu, Iv and Iw and the voltage command signals Vu, Vv and Vw is well known, a further description thereof is omitted.

The charge-signal operation unit 30 includes a voltage regulator 31, a three-phase voltage generation unit 32 and a PWM unit 33. The charge-signal operation unit 30 operates while the battery-charge command signal SC is in the high level.

The voltage regulator 31 compares the terminal voltage Va+ of the auxiliary battery with the reference voltage Vref and provides a charge signal Vc if the terminal voltage Va+ is lower than the reference voltage Vref.

The three-phase voltage generation unit 32 forms the three-phase high frequency voltage signals Vcu, Vcv and Vcw in response to the above charge signal Vc.

The PWM unit 33 forms the three-phase PWM signal Vcu', Vcv' and Vcw' from the three-phase high frequency voltage signals Vcu, Vcv and Vcw. The PWM unit 33 is almost the same in structure as the PWM unit 25 except that the frequency of the carrier wave is 100 kHz and that the output thereof is turned on or off when the level of the battery-charge command signal SC changes.

The signal-synthesizing unit 40 includes fast Fourier transform (FFT) units 401–406, adder units 411–413, inverse Fourier transform (IFT) units 421–423 and wave-shaping units 431–433.

The FFT units 401, 402 and 403 are well-known devices that transform three-phase PWM-voltage signals Vu', Vv' and Vw' to motor-generator operation signals Fu, Fv and Fw.

The FFT units 404, 405 and 406 are the same in structure as the FFT units 401, 402 and 403 that transform the PWM charge signals Vcu', Vcv' and Vcw' to battery charge condition signals Fcu, Fcv and Fcw.

The adder units 411-413 respectively add the motor-generator operation signals Fu, Fv and Fw to the battery charge condition signals Fcu, Fcv and Fcw to provide three-phase PWM voltage output signals. The adder units 411-413 are well-known hardware or software.

The IFT units 421-423 inversely transform the output frequency signals of the adder units 411–423 to time signals.

The wave-shaping units 431–433 shape the wave forms of the output signals of the IFT units 421–423 and provide three-phase PWM voltage signals that are applied to the gates of switching elements 501–506 of the inverter 50. When the three-phase PWM voltage signals drives the switching elements 501-506, the three-phase output voltage of the inverter 50 includes the frequency components of both the three-phase PWM-voltage signals Vu', Vv' and Vw' and the three-phase PWM charge signals Vcu', Vcv' and Vcw'.

Thus, the single three-phase inverter 50 can drive the motor-generator 1 as well as charge the auxiliary battery 4.

Figure 3:
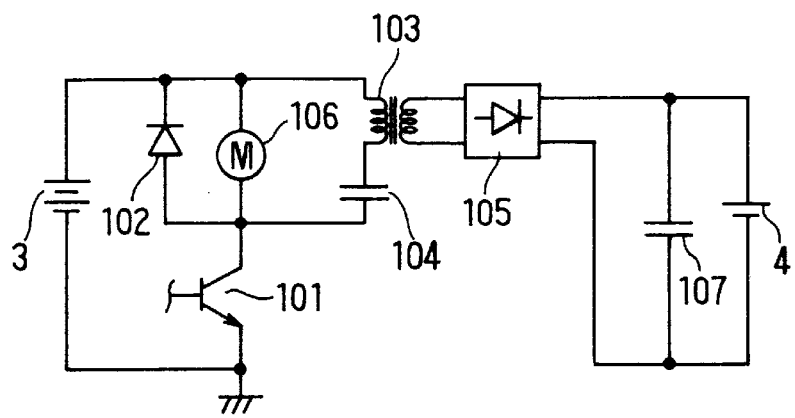
FIG. 3 is a circuit diagram of an electric power equipment according to a second embodiment of the invention.

An electric power equipment according to a second embodiment of the invention is described with reference to FIG. 3. The electric power equipment includes a switching transistor 101, a flywheel diode 102, a single-phase voltage transformer 103, a capacitor 104, a single-phase full-wave rectifier 105, a rotary electric machine (motor or a generator) 106 and a smoothing capacitor 107. The transformer 103 and the capacitor 104 form a frequency-filter-and-voltage-transformer (FTU). The resonance frequency of the FTU is fs.

A single-phase PWM voltage signal is formed in the same manner as described above and applied to the control electrode of the transistor 101. Accordingly, low-frequency current is supplied to the rotary electric machine 106, and high frequency current having the frequency fs is supplied to the auxiliary battery 4 through the FTU that is comprised of the transformer 103 and the capacitor 104. The low frequency current can be controlled by any device other than those used in the first to third embodiments.

Figure 4:
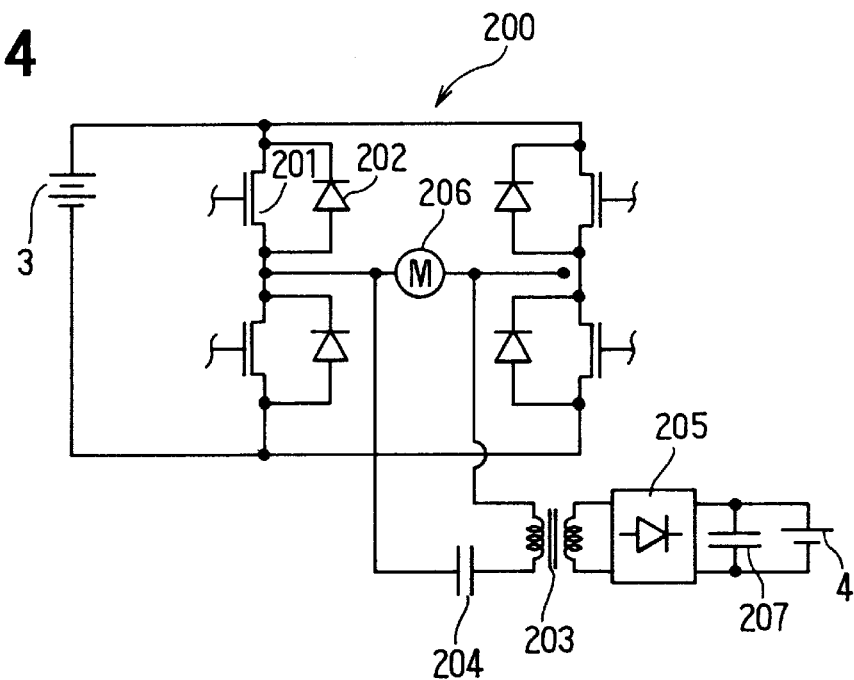
FIG. 4 is a circuit diagram of an electric power equipment according to a third embodiment of the invention.

An electric power equipment according to a third embodiment of the invention is described with reference to FIG. 4.

The electric power equipment includes an H-type bridge circuit 200, a motor 206, a single-phase voltage transformer 203, a capacitor 204, a single-phase full-wave rectifier 205 and a smoothing capacitor 207. The H-type bridge circuit 200 includes four switching transistors 201 and four flywheel diodes 202.

When the switching transistors 201 are controlled in the same manner as described above, low-frequency current is supplied to the motor 206. At the same time, the high frequency current having the resonance frequency fs is supplied to the auxiliary battery 4 through the FTU that is comprised of the transformer 203 and the capacitor 204.

The foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. An electric power equipment for supplying a rotary electric machine with higher voltage power and electric loads with lower voltage power, said electric power equipment comprising:

a main battery;

an auxiliary battery;

an inverter, connected between said rotary electric machine and said main battery, for supplying said rotary electric machine a prescribed lower-frequency AC power from said main battery and said main battery with DC power from said rotary electric machine; and a main-to-auxiliary battery-power supply circuit, connected between said rotary electric machine and said auxiliary battery, for supplying electric power to said auxiliary battery when the terminal voltage of said auxiliary battery is lower than a reference voltage; wherein said main-to-auxiliary power supply circuit comprises: a frequency filter, connected to said rotary electric machine, for passing only AC power of a prescribed higher frequency that is too high for said rotary electric machine to be operated, a rectifier connected between said frequency filter and said auxiliary battery and a controller for controlling said inverter to provide said AC power of said higher frequency when the terminal voltage of said auxiliary battery is lower than a reference voltage.

2. The electric power equipment as claimed in claim 1, wherein said controller provides inverter control signals to control said inverter to provide both said lower frequency AC power and said higher frequency AC power when the terminal voltage of said auxiliary battery is lower than said reference voltage.

3. The electric power equipment as claimed in claim 1, wherein said frequency filter comprises a series circuit of a coil and a capacitor having a resonance frequency.

4. The electric power equipment as claimed in claim 1, wherein said main-to auxiliary battery power supply circuit further comprises a voltage transformer having a primary coil connected to said rotary electric machine and a secondary coil connected to said rectifier, and said frequency filter comprises a series circuit of said primary coil and a capacitor.

5. An electric power equipment for supplying a rotary electric machine with higher voltage power and electric loads with lower voltage power, said electric power equipment comprising:

a main battery;

an auxiliary battery;

an inverter, connected between said rotary electric machine and said main battery, for supplying said rotary electric machine a prescribed lower-frequency AC power from said main battery and said main battery with DC power from said rotary electric machine; and means for charging said auxiliary battery when the terminal voltage of said auxiliary battery is lower than a reference voltage, wherein said means including a frequency filter for passing only AC power of a prescribed frequency that is too high for said rotary electric machine to be operated, a rectifier connected between said frequency filter and said auxiliary battery and a controller for controlling said inverter to provide said AC power of a prescribed frequency when the terminal voltage of said auxiliary battery is lower than a reference voltage.

6. An electric power equipment for supplying a rotary electric machine with higher voltage AC power and electric loads with lower DC voltage power, said electric power equipment comprising:

a main battery;

an auxiliary battery;

an inverter for converting DC power of said main battery to said higher voltage AC power of a first prescribed frequency from said main battery and converting output AC power of said rotary electric machine to DC power to charge said main battery; and means including a frequency filter for passing only AC power of a second prescribed frequency that is much higher than said first prescribed frequency, a rectifier connected between said frequency filter and said auxiliary battery and a controller for controlling said inverter to provide said AC power of said second prescribed frequency when the terminal voltage of said auxiliary battery is lower than a reference voltage.

* * * * *